United States Patent
Dabic et al.

(10) Patent No.: US 10,261,587 B2
(45) Date of Patent: Apr. 16, 2019

(54) DEVICE AND METHOD FOR HAPTIC TOUCH FEEDBACK IN A VEHICLE

(71) Applicant: DAV, Créteil (FR)

(72) Inventors: Stéphanie Dabic, Créteil (FR); Nour-Eddine El-Ouardi, Créteil (FR)

(73) Assignee: DAV, Créteil (FR)

( * ) Notice: Subject to any disclaimer, the term of this patent is extended or adjusted under 35 U.S.C. 154(b) by 0 days.

(21) Appl. No.: 15/533,822

(22) PCT Filed: Dec. 14, 2015

(86) PCT No.: PCT/FR2015/053479
§ 371 (c)(1),
(2) Date: Jun. 7, 2017

(87) PCT Pub. No.: WO2016/097562
PCT Pub. Date: Jun. 23, 2016

(65) Prior Publication Data
US 2017/0329405 A1    Nov. 16, 2017

(30) Foreign Application Priority Data
Dec. 15, 2014    (FR) ...................... 14 02859

(51) Int. Cl.
*B60Q 9/00*    (2006.01)
*G06F 3/01*    (2006.01)
(Continued)

(52) U.S. Cl.
CPC ............... *G06F 3/016* (2013.01); *B60Q 9/00* (2013.01); *G06F 3/041* (2013.01); *G06F 3/044* (2013.01);
(Continued)

(58) Field of Classification Search
CPC ............... G06F 3/016; G06F 2203/014; B60K 2350/1024–2350/1036
See application file for complete search history.

(56) References Cited

U.S. PATENT DOCUMENTS

2005/0122317 A1    6/2005    Schaaf et al.
2006/0119573 A1    6/2006    Grant et al.
(Continued)

FOREIGN PATENT DOCUMENTS

DE    10 2011 018897 A1    10/2012
DE    102011018897 A1 *    10/2012    ............. G06F 3/016
(Continued)

OTHER PUBLICATIONS

International Search Report issued in PCT/FR2015/053479 dated Feb. 12, 2016 (3 pages).
(Continued)

Primary Examiner — Laurence J Lee
(74) Attorney, Agent, or Firm — Osha Liang LLP

(57) ABSTRACT

A control device for automotive vehicle is disclosed. The control device includes a tactile surface to detect a contact of a finger of a user, a haptic feedback module configured to vibrate the tactile surface, and a drive unit configured to drive the haptic feedback module so as to generate a haptic feedback in response to a press on the tactile surface. The haptic feedback is composed of at least two individual haptic patterns which exhibit an identical trend and are generated successively, with a period of no haptic feedback intercalated between two successive individual haptic patterns, the energy of the individual haptic patterns varying with their repetition. A method of control of such a device is also disclosed.

19 Claims, 2 Drawing Sheets

(51) Int. Cl.
*G06F 3/041* (2006.01)
*G06F 3/044* (2006.01)
*G06F 3/0488* (2013.01)

(52) U.S. Cl.
CPC ........ *G06F 3/0488* (2013.01); *G06F 3/04886* (2013.01)

(56) References Cited

U.S. PATENT DOCUMENTS

| | | | |
|---|---|---|---|
| 2010/0309142 A1* | 12/2010 | Cruz-Hernandez | G06F 3/016 345/173 |
| 2012/0162114 A1* | 6/2012 | Inoue | G06F 3/016 345/173 |
| 2014/0292668 A1* | 10/2014 | Fricklas | G06F 3/041 345/173 |
| 2014/0354570 A1* | 12/2014 | Makinen | G06F 3/041 345/173 |
| 2015/0097791 A1* | 4/2015 | Lisseman | G06F 3/0414 345/173 |

FOREIGN PATENT DOCUMENTS

| | | | | |
|---|---|---|---|---|
| EP | 2 264 572 A2 | | 12/2010 | |
| EP | 2 733 576 A1 | | 5/2014 | |
| JP | 06083296 A | * | 3/1994 | ............... G09G 3/00 |
| JP | 2014084769 A | * | 5/2014 | ............. F02D 45/00 |

OTHER PUBLICATIONS

Written Opinion of the International Searching Authority issued in PCT/FR2015/053479 dated Feb. 12, 2016 (8 pages).

* cited by examiner

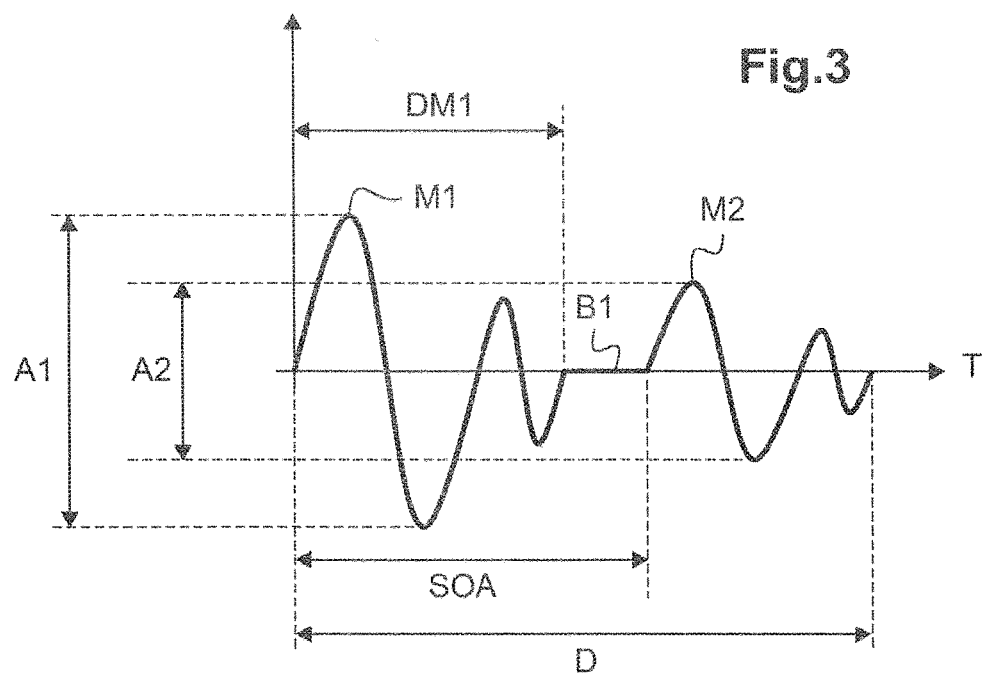

DEVICE AND METHOD FOR HAPTIC TOUCH FEEDBACK IN A VEHICLE

The present invention relates to a control device and method for an automotive vehicle.

In the last few years, cars have become easier to drive with the appearance of new emerging technologies (for example power steering, ABS, cruise control, parking sensors, etc.). Paradoxically however, the number of functions to be controlled while driving has also greatly increased. This may create a certain complexity relating to unfamiliarity with the use of these functionalities and their diversity. The car has become a veritable living space, regarded as an interconnected personal communication center with, for example, an MP3 player, GPS and link to mobile phones.

The introduction of these new functions has resulted in an increase in the number of buttons on the instrument panel of a car's passenger compartment. However, the number of buttons cannot increase indefinitely, in particular because of the resulting complexity, space limitations, accessibility or cognitive load. In addition, the interaction of the driver with on-board systems in the car may create a situation of attentional overload in which the driver cannot optimally process all of the information related to the task of driving, leading to mistakes and overly long detection times.

One possibility is to centralize the buttons by replacing them with a touch surface. This makes it possible to continue to increase the number of functions, the latter becoming programmable and reconfigurable and being displayed temporarily or permanently depending on the context or the activated function. The touch surface thus enables multi-functionality, while virtualizing the buttons and being personalizable.

However, unlike the case of a push-button, when the driver interacts with a touch surface he or she receives no feedback related directly to his or her action on the interface, other than the simple contact of his finger pressing against the surface.

In order to compensate for the loss of information caused by the replacement of conventional mechanical interfaces with touch surfaces, provision is made to add a stimulus, such as a haptic stimulus, to provide feedback from the system to the user. This stimulus makes it possible to avoid ambiguity as to whether the action of the user has been registered by the system, which ambiguity is liable to increase the likelihood of dangerous situations occurring. However, it is furthermore necessary to avoid overloading the driver's visual and auditory pathways, which are already greatly taxed by the driving task. Specifically, the use of touch surfaces in an automotive vehicle must not distract the driver.

One aim of the present invention is to provide a control device which does not interfere with driving, which is easily perceived and understood by users, and which may be distinguished from other signals.

To this end, one subject of the present invention is a control device for an automotive vehicle including:
- a touch surface intended to detect contact of a finger of a user; and
- a haptic feedback module configured to vibrate the touch surface;
- characterized in that it includes a driver unit configured to drive the haptic feedback module in order to generate haptic feedback in response to pressing on the touch surface, the haptic feedback consisting of:
  - at least two individual haptic patterns, having an identical aspect, generated in succession, with
  - a period without haptic feedback, intercalated between two successive individual haptic patterns;
  - the energy of the individual haptic patterns varying with their repetition.

The periods without haptic feedback for which there is no perceptible movement of the touch surface make it possible to produce an incremental/decremental effect for the user interacting with the touch surface. The user is thus provided with an indication as to the function that may be enabled through the interaction with the touched touch surface.

According to one or more features of the control device, either alone or in combination:
- the energy of the individual haptic patterns increases or decreases monotonically with their repetition;
- it is the peak-to-peak maximum value of the acceleration and/or it is the peak-to-peak maximum value of the movement of the touch surface which varies monotonically with repetition;
- the variation in the peak-to-peak maximum value of the acceleration and/or the variation in the peak-to-peak maximum value of the movement of the touch surface follows a linear relationship as a function of time.

According to a first exemplary embodiment, the linear relationship defines a gradual increase in the value of the acceleration as a function of time such that the ratio of:
- the peak-to-peak maximum value of the acceleration of a given individual haptic pattern to
- the peak-to-peak maximum value of the acceleration of the individual haptic pattern preceding the given individual haptic pattern is between 0.6 and 0.95.

The sensation of an increase is thus given to the user, which allows him or her to better understand the function that may be enabled by the touched touch surface.

According to another exemplary embodiment, the linear relationship defines a gradual decrease in the value of the acceleration as a function of time such that the ratio of:
- the peak-to-peak maximum value of the acceleration of a given individual haptic pattern to
- the peak-to-peak maximum value of the acceleration of the individual haptic pattern preceding the given individual haptic pattern is between 1.05 and 1.4.

The sensation of a decrease is thus given to the user, which allows him or her to better understand the function that may be enabled by the touched touch surface.

According to another exemplary embodiment, the linear relationship defines a gradual increase in the value of the acceleration as a function of time such that the ratio of:
- the peak-to-peak maximum value of the acceleration of a given individual haptic pattern to
- the peak-to-peak maximum value of the acceleration of the individual haptic pattern preceding the given individual haptic pattern is between 0.6 and 0.55.

The sensation perceived by the user sliding his or her finger over the touch surface is thus reinforced. This makes it possible to give the illusion of a direction to the sliding action.

According to another exemplary embodiment, the linear relationship defines a gradual decrease in the value of the acceleration as a function of time such that the ratio of:
- the peak-to-peak maximum value of the acceleration of a given individual haptic pattern to
- the peak-to-peak maximum value of the acceleration of the individual haptic pattern preceding the given individual haptic pattern is between 1.2 and 1.3.

The sensation perceived by the user sliding his or her finger over the touch surface is thus weakened. This makes it possible to give the illusion of a direction to the sliding action.

According to one or more further features of the control device, either alone or in combination:
- the individual haptic pattern is repeated between three and 10 times;
- the haptic feedback is generated for a predefined duration of between three and 5000 milliseconds;
- a period without haptic feedback is between five and 200 milliseconds;
- the peak-to-peak value of the acceleration of the individual haptic patterns is between 0.5 G and 15 G;
- the frequency of the individual haptic patterns is between 60 Hz and 400 Hz.

According to another embodiment:
- first and second successive individual haptic patterns are generated;
- the duration of the first individual haptic pattern is between 10 and 200 milliseconds;
- the ratio of:
  - the peak-to-peak maximum value of the acceleration of the first individual haptic pattern to
  - the peak-to-peak maximum value of the acceleration of the second individual haptic pattern is between 0.25 and 4;
- the predefined duration for which the individual haptic patterns are generated is shorter than 200 milliseconds; and
- the inter-command duration between the start of a first control signal generating the first individual haptic pattern and the start of a second control signal generating the second individual pattern is between 20 and 200 milliseconds.

These haptic feedback characteristics make it possible to provide the sensation of performing a validation on the touch surface, akin to double-clicking a mouse. This effect may also be used to confirm an action.

Provision may also be made for the control device to include a display device positioned below the touch surface in order to display a graphical element through the touch surface and for the driver unit to be configured to drive the haptic feedback module in order to generate haptic feedback in response to pressing in the area of the graphical element.

Another subject of the invention is a control method for controlling a device as described above, in which haptic feedback is generated in response to pressing on the touch surface, the haptic feedback consisting of:
- at least two individual haptic patterns, having an identical aspect, generated in succession, with
- a period without haptic feedback, intercalated between two successive individual haptic patterns;
- the energy of the individual haptic patterns varying with their repetition.

According to one or more features of the control method, either alone or in combination:
- the energy of the individual haptic patterns increases or decreases monotonically with their repetition;
- it is the peak-to-peak maximum value of the acceleration and/or it is the peak-to-peak maximum value of the movement of the touch surface which varies monotonically with repetition;
- the variation in the peak-to-peak maximum value of the acceleration and/or the variation in the peak-to-peak maximum value of the movement of the touch surface follows a linear relationship as a function of time.

BRIEF DESCRIPTION OF THE DRAWINGS

Other advantages and features will become apparent upon reading the description of the invention and in the appended figures which show a non-limiting exemplary embodiment of the invention, in which:

FIG. 3 shows a curve representing the value of the acceleration of the movement of the touch surface as a function of time for another example of haptic feedback.

In these figures, the same elements bear the same reference numbers.

DETAILED DESCRIPTION

Figure 1:
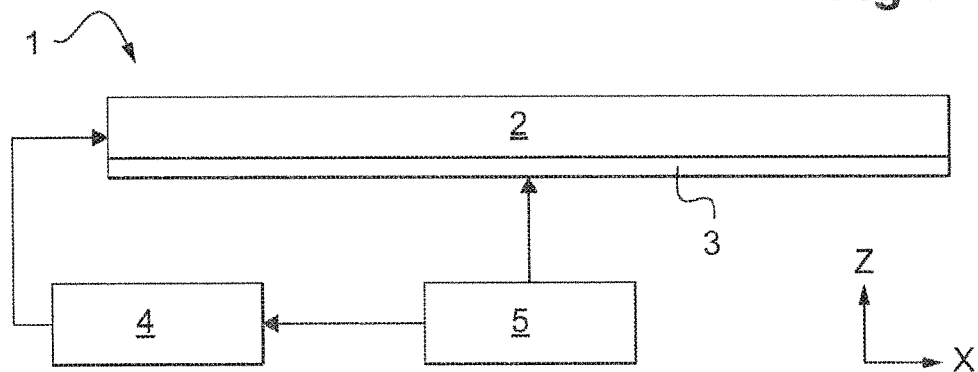
FIG. 1 shows an exemplary control device for an automotive vehicle.

FIG. 1 shows a control device 1 for an automotive vehicle, for example mounted in the instrument panel or in a center console of the vehicle, for controlling on-board systems of the vehicle such as the air-conditioning, radio, music, phone, ventilation or navigation systems.

The control device 1 includes a touch surface 2 and a haptic feedback module 4 configured to vibrate the touch surface 2. The term "haptic" refers to feedback by touch. Thus, haptic feedback is a vibratory or vibrotactile signal.

The touch surface 2 is intended to detect contact on the touch surface 2 by a finger of a user or any other activation means (for example a stylus) of a user having for example modified or selected a command.

The control device 1 may include a display device 3 positioned below the touch surface 2 in order to display a graphical element through the touch surface 2, which is then transparent, thus forming a touchscreen, for example.

A touchscreen is an input peripheral device enabling users of a system to interact therewith by virtue of touch. It allows the user to interact directly with the area that he or she wants to select for various purposes such as, for example, the selection of a destination address or of a name in a directory, the settings of the air-conditioning system, the activation of a dedicated function, the selection of a track from a list or, in general, scrolling through a list of choices, selection, validation, and errors.

The touch surface 2 includes a plate bearing a contact sensor for detecting a push pressure or a movement of the finger or of a stylus of the user.

The contact sensor is, for example, a pressure sensor, such as one using FSR (force-sensing resistor) technology, i.e. using pressure-sensitive resistors. FSR technology exhibits a very high level of strength and robustness, while having high resolution. Furthermore, it is highly reactive and accurate, while being relatively stable over time. It can have a fairly long life, and can be used with any type of activation means, at a relatively low cost.

According to one FSR technology design, the sensor operates by bringing two conductive layers into contact, for example through the action of the finger. One of the embodiments consists in covering a glass plate with a layer of conductive ink, on which a sheet of flexible polyester is superposed, which is itself covered on its inner face by a layer of conductive ink. Transparent, insulating blocks insulate the plate from the polyester sheet. Activation on the touch surface causes a slight depression of the polyester layer, which comes into contact with the conductive layer of the glass plate. The local contact of the two conductive layers results in a change in the electrical current applied to the plate, corresponding to a voltage gradient.

According to another example, the contact sensor comprises flexible semiconductive layers sandwiched between, for example, a conductive layer and a resistive layer. By exerting a pressure or a dragging action on the FSR layer, its ohmic resistance decreases, thus making it possible, through the application of a suitable voltage, to measure the pressure applied and/or the location of the point where the pressure is exerted.

According to another example, the contact sensor is based on capacitive technology.

The haptic feedback module 4 includes at least one actuator (not shown), linked to the plate of the touch surface 2, in order to generate haptic feedback as a function of a signal from the contact sensor. The haptic feedback is a vibratory signal such as a vibration produced by a sinusoidal control signal or by a control signal, including a pulse or a succession of pulses, sent to the actuator. The vibration is for example directed along the plane of the touch surface 2 or orthogonally to the plane of the touch surface 2, or even directed along a combination of these two directions.

In the case of a plurality of actuators, these are arranged below the touch surface 2, in various positions (at the center or to one side) or in various orientations (in the direction of pressing on the surface or along another axis).

According to one exemplary embodiment, the actuator is based on a technology akin to loudspeaker (voice coil) technology. It comprises a fixed part and a part that is able to move translationally within an air gap of the fixed part, for example of the order of 200 μm, between a first position and a second position, parallel to a longitudinal axis of the moving part. The moving part is, for example, formed by a moving magnet sliding inside a fixed coil or by a moving coil sliding around a fixed magnet, the moving part and the fixed part interacting through electromagnetic effect. The moving parts are linked to the plate in such a way that the movement of the moving parts generates the translational movement of the plate in order to generate the haptic feedback provided to the finger of the user. This technology is easy to control and allows substantial masses, like that of a screen, to be moved at various frequencies and meets the very strict constraints for automotive vehicles, namely low cost, high resistance to large temperature variations, and ease of installation.

The control device 1 additionally includes a driver unit 5 configured to drive the haptic feedback module 4 in order to generate haptic feedback in response to pressing on the touch surface 2, for example in the location of a graphical element of the display device 3, such as an icon or pictogram.

The touch surface 2 is being pressed for as long as the finger remains in contact with the touch surface 2. When the user removes his or her finger and then presses the touch surface 2 once more, haptic feedback is generated anew. Haptic feedback is thus generated for each press.

The haptic feedback consists of at least two individual haptic patterns M1, M2, M3 . . . Mn having an identical aspect, with a period without haptic feedback B1, B2, intercalated between two successive individual haptic patterns M1, M2, M3 . . . Mn.

To achieve this, the driver unit 5 sends control signals to the haptic feedback module 4 including, for example, a control pulse sent to the actuator, for example in the form of a square, triangle or sine wave.

Each control signal generates one individual haptic pattern.

Figure 2:
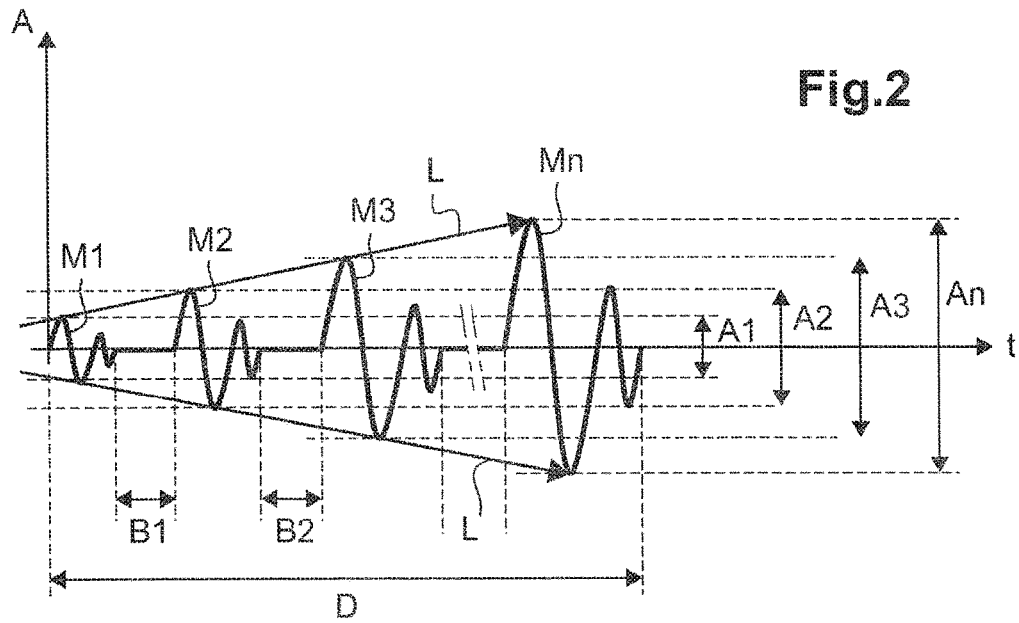
FIG. 2 shows a curve representing the value of the acceleration of the movement of the touch surface as a function of time for an example of haptic feedback.

FIG. 2 shows an example of haptic feedback, illustrated by the measurement of the acceleration of the touch surface 2 along Z, in a direction parallel to the direction of pressing the finger on the touch surface 2. The acceleration value measured for the individual haptic patterns M1, M2, M3 . . . Mn generally takes the form of a damped sine wave. The same illustration may be obtained by measuring the movement of the touch surface 2 along Z.

The energy of the individual haptic patterns M1, M2, M3 Mn varies with their repetition over time. For example, the energy of the individual haptic patterns M1, M2, M3 . . . Mn increases or decreases gradually over time.

More specifically, it is, for example, the peak-to-peak maximum value of the acceleration A which varies with the repetition of the individual haptic pattern M1, M2, M3 . . . Mn. According to another example, it is the peak-to-peak maximum value of the movement of the touch surface 2 which varies with the repetition of the individual haptic pattern M1, M2, M3 Mn.

The peak-to-peak value of the acceleration A of the haptic patterns A1, A2, A3, A4 is, for example, between 0.5 G and 15 G.

The individual haptic patterns M1, M2, M3 . . . Mn generated have the same aspect (or "shape"), the same frequency and the same phase shift. The frequency of the haptic patterns M1, M2, M3 Mn is, for example, between 60 Hz and 400 Hz.

At the end of the acceleration and/or of the movement of the touch surface 2, for example when the value of the acceleration of the touch surface 2 is lower than 1G, a period without haptic feedback B1, B2, during which there is no movement of the touch surface 2, begins.

A period without haptic feedback B1, B2 is, a period for which no acceleration or movement of the touch surface 2 is perceived, since it is zero or smaller than the vibrations of the moving vehicle. It is, for example, an acceleration that is smaller than 1G.

The duration of a period without haptic feedback B1, B2 is, for example, between 10 and 240 milliseconds. The periods without haptic feedback B1, B2 repeated between the individual haptic patterns M1, M2, M3 . . . Mn may or may not be identical.

According to one exemplary embodiment, the end of a period without haptic feedback B1, B2 is managed by controlling the inter-command duration SOA between the start of a control signal generating an individual haptic pattern M1 and the start of a subsequent control signal.

According to another example, the duration of a period without haptic feedback B1, B2 is determined, for example, by measuring the duration from which the measured acceleration is smaller than a predetermined threshold.

The periods without haptic feedback B1, B2 for which there is no movement of the touch surface 2 make it possible to produce an incremental/decremental effect for the user interacting with the touch surface 2. The user is thus provided with an indication as to the function that may be enabled through the interaction with the touched touch surface 2.

Haptic feedback may be generated for a predefined duration D or may be generated for as long as the finger is in contact with the touch surface 2.

For example, the individual haptic pattern M1, M2, M3 Mn is repeated between 3 and 10 times over a predefined duration D, for example between 10 and 5000 milliseconds, such as between 10 and 3000 milliseconds.

A period without haptic feedback B1, B2 is, for example, between five and 200 milliseconds.

The example of FIG. 2 thus shows haptic feedback generated in response to pressing on the touch surface 2, exhibiting a repetition of multiple haptic patterns M1, M2, M3 . . . Mn. A first period without haptic feedback B1 is intercalated between two first individual haptic patterns M1 and M2. A second period without haptic feedback B2 is intercalated between the individual haptic patterns M2 and M3, and so on.

According to one exemplary embodiment, the gradual increase or decrease in the value of the acceleration is such that the variation in the peak-to-peak maximum value of the acceleration A1, A2, A3, A4 of the haptic patterns follows a linear relationship L as a function of time t. Similarly, provision may be made for the gradual increase or decrease in the value of the movement of the touch surface 2 to be such that the variation in the peak-to-peak maximum value of the movement of the touch surface 2 follows a linear relationship L as a function of time t.

This linear relationship L is, for example, such that the ratio of the peak-to-peak maximum value of the acceleration A2 of an individual haptic pattern N to the peak-to-peak maximum value of the acceleration A1 of a preceding individual haptic pattern N−1 is between 0.6 and 0.95.

This relationship may, for example, be associated with a graphical element in the form of a button. A sensation of an increase is thus given to the user, which allows him or her to better understand the function of the graphical element.

According to another example, this linear relationship L is, such that the ratio of the peak-to-peak maximum value of the acceleration A2 of an individual haptic pattern N to the peak-to-peak maximum value of the acceleration A1 of a preceding individual haptic pattern N−1 is between 1.05 and 1.4.

This relationship may, for example, be associated with a graphical element in the form of a button. A sensation of a decrease is thus given to the user, which allows him or her to better understand the function of the graphical element.

For these two examples, provision may be made for the haptic feedback to be generated for a long predefined duration D, such as between 500 and 5000 milliseconds.

The associated function allows, for example, a function to be quickly incremented/decremented. For example, for a ventilator function, the user, by pressing on a graphical element representing a big fan, is able to directly increase ventilation to the maximum value. Similarly, the user, by pressing on a graphical element representing a small fan, is able to directly decrease ventilation to the minimum value.

According to another example illustrated in FIG. 3, provision is made for:
first and second successive individual haptic patterns M1, M2 to be generated;
the duration DM1 of the first individual haptic pattern M1 to be between 10 and 200 milliseconds;
the ratio of:
the peak-to-peak maximum value of the acceleration A1 of the first individual haptic pattern M1 to
the peak-to-peak maximum value of the acceleration A2 of the second individual haptic pattern M2 to be between 0.25 and 4;
the predefined duration D for which the individual haptic patterns M1, M2 are generated to be shorter than 200 milliseconds; and
the inter-command duration SOA between the start of a first control signal generating the first individual haptic pattern M1 and the start of a second control signal generating the second individual pattern M2 to be between 20 and 200 milliseconds.

These haptic feedback characteristics make it possible to provide the sensation of performing a validation on the touch surface 2, akin to double-clicking a mouse. This effect may also be used to confirm an action. Thus, provision may be made in parallel for the driver unit 5 to await confirmation of an action.

According to another exemplary configuration, provision may be made for the linear relationship L to be such that the ratio of the peak-to-peak maximum value of the acceleration A2 of the touch surface 2 of an individual haptic pattern N to the peak-to-peak maximum value of the acceleration A1 and/or of the movement of the touch surface 2 of a preceding individual haptic pattern N−1 is between 0.6 and 0.55.

This relationship may, for example, be associated with a graphical element in the form of a rotary or rectilinear cursor. The sensation perceived by the user sliding his or her finger over the touch surface 2 is thus reinforced. This makes it possible to give the illusion of a direction to the sliding action.

Provision may also be made for the gradual decrease in the value of the acceleration and/or of the movement of the touch surface 2 of the individual haptic patterns M1, M2, M3 . . . Mn to follow a linear relationship L such that the ratio of the peak-to-peak maximum value of the acceleration A2 of an individual haptic pattern N to the peak-to-peak maximum value of the acceleration A1 and/or of the movement of the touch surface 2 of a preceding individual haptic pattern N−1 is between 1.2 and 1.3. The sensation perceived by the user sliding his or her finger over the touch surface 2 is thus weakened. This makes it possible to give the illusion of a direction to the sliding action.

The invention claimed is:

1. A control device for an automotive vehicle, comprising:
a touch surface intended to detect contact of a finger of a user;
a haptic feedback module configured to vibrate the touch surface; and
a driver unit configured to drive the haptic feedback module to generate haptic feedback in response to pressing on the touch surface, the haptic feedback consisting of:
at least two individual haptic patterns, having an identical aspect, generated in succession, and
a period without haptic feedback, intercalated between two successive individual haptic patterns,
wherein the energy of the individual haptic patterns varies with repetition of the patterns,
wherein the period without haptic feedback begins when a value of the acceleration of the touch surface is smaller than vibrations caused by movement of the vehicle.

2. The control device as claimed in claim 1, wherein the energy of the individual haptic patterns increases or decreases monotonically with their repetition.

3. The control device as claimed in claim 1, wherein the peak-to-peak maximum value of the acceleration and/or the peak-to-peak maximum value of the movement of the touch surface varies monotonically with repetition.

4. The control device as claimed in claim 3, wherein the variation in the peak-to-peak maximum value of the acceleration and/or the variation in the peak-to-peak maximum value of the movement of the touch surface follows a linear relationship as a function of time.

5. The control device as claimed in claim 4, wherein the linear relationship defines a gradual increase in the value of the acceleration as a function of time such that the ratio of:

the peak-to-peak maximum value of the acceleration of a given individual haptic pattern to the peak-to-peak maximum value of the acceleration of the individual haptic pattern preceding the given individual haptic pattern is between 0.6 and 0.95.

6. The control device as claimed in claim 4, wherein the linear relationship defines a gradual decrease in the value of the acceleration as a function of time such that the ratio of:

the peak-to-peak maximum value of the acceleration of a given individual haptic pattern to the peak-to-peak maximum value of the acceleration of the individual haptic pattern preceding the given individual haptic pattern is between 1.05 and 1.4.

7. The control device as claimed in claim 4, wherein the linear relationship defines a gradual increase in the value of the acceleration as a function of time such that the ratio of:

the peak-to-peak maximum value of the acceleration of a given individual haptic pattern to the peak-to-peak maximum value of the acceleration of the individual haptic pattern preceding the given individual haptic pattern is between 0.6 and 0.55.

8. The control device as claimed in claim 4, wherein the linear relationship defines a gradual decrease in the value of the acceleration as a function of time such that the ratio of:

the peak-to-peak maximum value of the acceleration of a given individual haptic pattern to the peak-to-peak maximum value of the acceleration of the individual haptic pattern preceding the given individual haptic pattern is between 1.2 and 1.3.

9. The control device as claimed in claim 4, wherein:

first and second successive individual haptic patterns are generated;

the duration of the first individual haptic pattern is between 10 and 200 milliseconds;

the ratio of:

the peak-to-peak maximum value of the acceleration of the first individual haptic pattern to the peak-to-peak maximum value of the acceleration of the second individual haptic pattern is between 0.25 and 4;

the predefined duration for which the individual haptic patterns are generated is shorter than 200 milliseconds; and the inter-command duration between the start of a first control signal generating the first individual haptic pattern and the start of a second control signal generating the second individual pattern is between 20 and 200 milliseconds.

10. The control device as claimed in claim 1, wherein the individual haptic pattern is repeated between three and 10 times.

11. The control device as claimed in claim 1, wherein the haptic feedback is generated for a predefined duration of between three and 5000 milliseconds.

12. The control device as claimed in claim 1, wherein a period without haptic feedback is between five and 200 milliseconds.

13. The control device as claimed in claim 1, wherein the peak-to-peak value of the acceleration of the individual haptic patterns is between 0.5 G and 15 G.

14. The control device as claimed in claim 1, wherein the frequency of the individual haptic patterns is between 60 Hz and 400 Hz.

15. The control device as claimed in claim 1, a display device positioned below the touch surface in order to display a graphical element through the touch surface and wherein the driver unit is configured to drive the haptic feedback module to generate haptic feedback in response to pressing in the area of the graphical element.

16. A control method for controlling a device for an automotive vehicle, comprising:

detecting contact of a finger of a user by a touch surface of the device; and generating a haptic feedback by a driver unit of a haptic feedback module of the device in response to pressing on the touch surface, wherein the haptic feedback module is configured to vibrate the touch surface;

wherein the haptic feedback consists of:

at least two individual haptic patterns, having an identical aspect, generated in succession, with a period without haptic feedback, intercalated between two successive individual haptic patterns;

the energy of the individual haptic patterns varying with their repetition;

wherein the period without haptic feedback begins when a value of the acceleration of the touch surface is smaller than vibrations caused by movement of the vehicle.

17. The control method as claimed in claim 16, wherein the energy of the individual haptic patterns increases or decreases monotonically with their repetition.

18. The control method as claimed in claim 16, wherein the peak-to-peak maximum value of the acceleration and/or it is the peak-to-peak maximum value of the movement of the touch surface varies monotonically with repetition.

19. The control method as claimed in claim 18, wherein the variation in the peak-to-peak maximum value of the acceleration and/or the variation in the peak-to-peak maximum value of the movement of the touch surface follows a linear relationship as a function of time.

* * * * *